Nov. 23, 1965    W. H. HAINER ET AL    3,219,162
SWING MOUNTED POWER DRIVEN BOOM
Filed Oct. 1, 1963
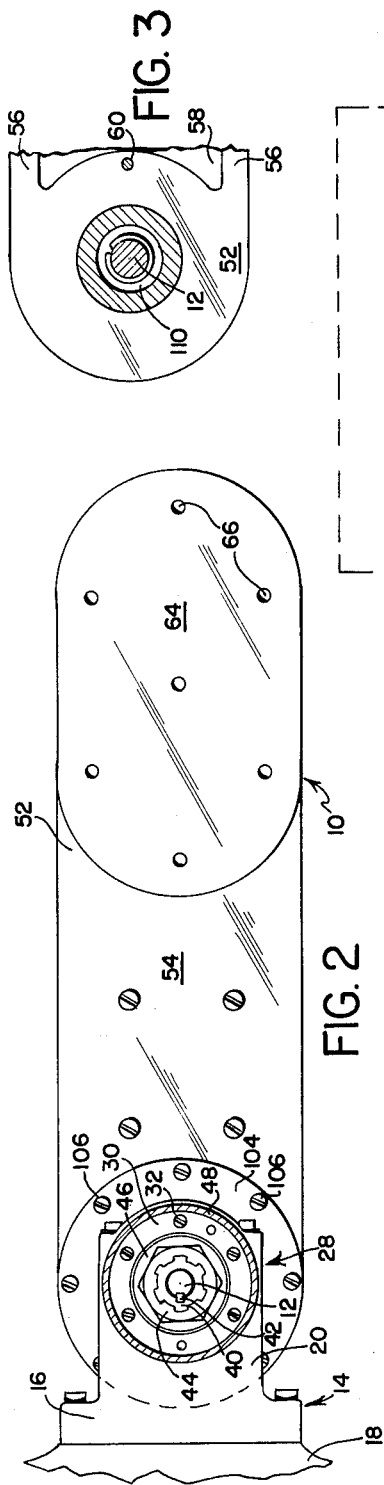
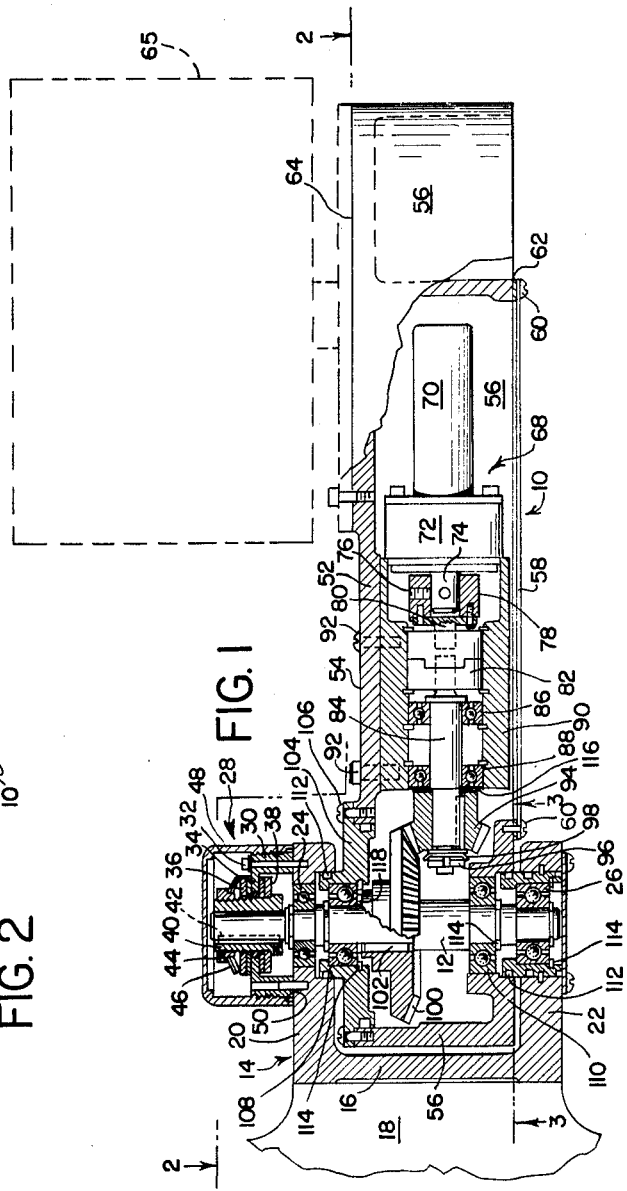
INVENTORS
WILLIAM H. HAINER
FLOYD P. VAN De WEGHE
BY Robert B. Hughes
ATTORNEY United States Patent Office 3,219,162
Patented Nov. 23, 1965

3,219,162
SWING MOUNTED POWER DRIVEN BOOM
William H. Hainer, St. Paul, and Floyd P. Van De Weghe, Minneapolis, Minn., assignors to General Mills, Inc., a corporation of Delaware
Filed Oct. 1, 1963, Ser. No. 313,088
8 Claims. (Cl. 192—4)

This invention relates to a swing mounted power driven boom, and more particularly to such a boom used for carrying a television camera or other such device, which boom is especially adapted for such use in conjunction with a remotely controlled manipulator, vehicle or the like.

One method of enabling an operator to obtain an adequate view of the area of operation of a remotely controlled manipulator or vehicle is to mount a television camera to the vehicle or manipulator by means of a swing arm or boom. This permits the camera to be moved to different positions with respect to the vehicle so that the vehicle or manipulator itself (i.e. the carrier) or some object will not obstruct the camera's view of various areas. However, by so mounting the camera, travel or change of position of the manipulator or vehicle or movement of the camera and its associated arm or boom will cause varying gravitational and/or inertial forces to act on the camera and its associated arm to cause the camera to wobble, shift, or vibrate (due to backlash of the mechanism which moves the arm) so that the camera transmits an obscure picture. On the other hand, it is not practical to so mount the camera that it is firmly and strongly held to the carrier, since in moving the manipulator or vehicle remotely or the camera itself, the camera might come into contact with some object, and to prevent damage to the camera or its mounting apparatus, provision must be made in this mounting for the camera to yield under a somewhat moderate force.

Yet another problem is to so mount the camera that the mounting apparatus itself does not obstruct the view of the camera to any great extent. Also, since remote controlled devices are operated generally in somewhat hostile environments, consideration must be given to sealing off or protecting the actuating components of the boom from water or other material, from contamination as from radio-active substances, etcetera. Yet the various components must be made readily accessible for maintenance and/or adjustment.

Thus it is an object of the present invention to provide such a boom especially adapted for use under the circumstances previously described, which boom is self-contained and relatively simple and compact; which substantially eliminates any "backlash" so as to provide a stable mounting; whose components are easily accessible for replacement and/or adjustment; which has clutch means to prevent overload, either external (such as is caused by an external object striking the boom) or internal, and has the overload clutch means so disposed as to be especially convenient for adjustment; and which is so arranged so as to be readily sealed so as to be able to operate in hostile environments, such as in adverse weather conditions, in areas of contamination, etc.

FIGURE 1 is a longitudinal vertical sectional view of the apparatus of the present invention;

FIGURE 2 is a top plan view taken partly in section along line 2—2 of FIGURE 1, and FIGURE 3 is a fragmentary horizontal sectional view taken generally along line 3—3 of FIGURE 1, but showing merely the arm portion of the present invention.

Referring to the accompanying drawing, it can be seen that the apparatus comprises generally an arm 10 mounted by its root end by means of a vertical pivot shaft 12 to a mounting clevis 14 for horizontal swing motion about the longitudinal axis of the pivot shaft 12. The mounting clevis 14 comprises a vertical shoulder portion 16 by which the clevis 14 is secured to the frame or body 18 of the vehicle or manipulator by which the power boom of the present invention is carried. Extending outwardly from the clevis shoulder portion 16 are an upper and a lower mounting arm 20 and 22, respectively, which arms are adjacent to, and positioned, respectively, above and below the root end of the swing arm 10.

These upper and lower arms 20 and 22 are each formed with a respective one of two vertically aligned through openings in which the shaft 12 is mounted by upper and lower bearings 24 and 26, respectively. Although the shaft 12 is mounted with respect to the clevis 14 for rotational movement therein, under normal operating conditions the shaft 12 is fixedly held to the clevis 14 by means of a overload brake, generally designated 28, located at the upper end of the shaft 12 above the upper clevis arm 20.

This brake mechanism 28 comprises a first brake plate 30 bolted at 32 to the upper clevis arm 20 and having an inwardly extending annular portion 34 presenting upper and lower brake faces. Engaging these faces of the brake portion 34 are a pair of annular upper and lower second brake members 36 and 38, respectively, each of which is slidably joined in a suitable manner (as by a spline connection or a key) to, and positioned circumjacent with, a collar 40 keyed at 42 to the upper end of the shaft 12. (Due to the small scale of the accompanying drawing, no attempt has been made to illustrate the precise manner of mounting the brake members 36 and 38 to the collar 40.)

To control the pressure between the brake members 34 and 36–38, a nut 44 is threaded on the upper end of the collar 40 and bears against the upper second brake member 36 through a spring washer 46, with the expanded lower portion of the collar 40 pressing the lower brake member 38 upwardly. Enclosing the brake mechanism 28 is a cover 48 which engages the outer peripheral portion of the first brake member 30 by means of a screw thread and seals the brake mechanism 28 from the surrounding atmosphere by means of a circumferential O-ring 50 at the lower edge of the cover 48. Thus, the torque load under which the brake mechanism 28 will slip so as to permit the shaft 12 to rotate with respect to the mounting clevis 14 can easily be adjusted by removing the cover 48 and either tightening or loosening the adjusting nut 44.

The swing arm 10 comprises generally a substantially closed outer case or housing 52 having a top wall 54 and a continuous side wall 56. So that the housing 52 can be sealed and yet so that the drive mechanism of the swing arm 10 is accessible and can be placed in and taken from the interior of the arm housing 52, the lower portion of the housing 52 is covered by a bottom plate 58 secured at 60 to the housing 52 and provided with a sealing gasket 62. The outer end portion (i.e. that end of the arm 10 opposite to the root end of the top wall 54) provides a mounting platform 64 on which a pan/tilt device (indicated schematically at 65) for a TV camera can be mounted, a plurality of bolt holes 66 being provided in the top wall 54 at this mounting location for this purpose. (For clarity, the terms "inner" or "rear," as used herein, will indicate proximity to the root end of the arm 10, while the terms "outer" or "front" indicate proximity to the outer end of the arm 10.)

Located in the outer end portion of the sealed interior of the arm housing 52 is a drive unit 68 comprising an electric motor 70 and a speed reducer 72 on which is mounted an inwardly extending output shaft 74. Connected by screws 76 to the output shaft 74 is an adaptor 78 by which the shaft 74 is secured to the drive shaft 80 of a reverse locking clutch 82 located to the rear of the drive unit 68. This reverse locking clutch 82 is or may be any one of a number of prior art commonly used and readily available units which permit the output shaft (indicated at 84) to be driven in either direction, but which prevent any feed back torque from the output side of the clutch from being transmitted to the input shaft (80 herein.) As will be indicated more clearly hereinafter, the incorporation of this reverse locking clutch 82 isolates the arm 10 from nearly all drive gearing backlash which is generally inherent in any gear-type speed reducing mechanism, such as that shown schematically at 72.

The output shaft 84 of the reverse locking clutch 82 is supported by front and rear bearings 86 and 88 in a bearing block 90 mounted, as at 92, within the arm housing 52. (This same bearing block 90 also provides a convenient mounting for the power unit 68 and the reverse locking clutch 82). Keyed on the rear end of the rearwardly extending output shaft 84 of the reverse locking clutch 82 is a drive bevel gear 94 which is retained thereon by means of a lock nut and washer 96–98 on the extreme rear end of the output shaft 84. This drive bevel gear 94 has its center axis aligned with the longitudinal axis of the arm 10 and meshes with a second or driven bevel gear 100 keyed or splined at 102 to the pivot shaft 12, which gear 100 has its center axis concentric with shaft 12 and is located within the enclosed chamber of the swing arm housing 52 at the root end thereof and below the upper clevis arm 20.

Thus, it can be seen that the motor 70 through the speed reducer 72 turns the drive shaft 80 of the reverse locking clutch 82 which in turn rotates the drive bevel gear 94 through its output shaft 84. Since the second bevel gear 100 is splined to the shaft 12 which is normally fixed with respect to the mounting clevis 14 by means of the brake mechanism 28, this second bevel gear 100 is normally stationary, and the arm 10 swings horizontally by virtue of the drive bevel gear 94 travelling along the circumference of the second bevel gear 100.

For convenience of assembly and accessibility, the top portion of the root end of the swing arm housing 52 is formed as a removable cover plate 104 secured at 106 to the housing 52. This plate 104 is provided with an opening to accommodate an upper bearing member 108 for the pivot shaft 12, while the lower root end of the swing arm housing 52 is likewise provided with a lower opening for a lower bearing 110 for the shaft 12, the arm 10 being thus mounted to the pivot shaft 12 by means of these bearings 108 and 110.

Although not shown in the accompanying drawing because of the reduced scale thereof, it should be understood that the various components of the apparatus of the present invention which are exposed to the surrounding atmosphere are provided at suitable locations with O-rings so as to seal the working parts of the apparatus, various locations of these O-rings being indicated by the numeral 112. It will also be noted that various locating or retaining rings are provided at suitable locations within the apparatus, some of these being indicated generally by the numeral 114.

Between the drive bevel gear 94 and the adjacent bearing 88, there is provided an adjustable laminated shim 116. Likewise, between the second bevel gear 100 and the bearing 108 immediately thereabove, there is a second laminated shim 118. By properly adjusting (and as the gears 94 and 100 experience some wear, further adjusting) these shims 116 and 118, the bevel gears 94 and 100 are maintained in tight engagement to prevent this gear engagement from being a source of backlash in the mechanism.

In operation, the arm 10 is swung horizontally (it is to be understood that the terms "horizontal" and "vertical" are only relative terms and do not necessarily correspond to the horizontal and vertical references of the surrounding environment) about the pivot shaft 12 by means of the motor 70 through the gear reducer 72 and the reverse locking clutch 82 which turns the drive bevel gear 94. When the motor 70 experiences an overload (as by the swing arm 10 engaging some object which stops its progress), the drive bevel gear 94 will tend to turn the shaft 12. With the overload brake 28 properly adjusted, this overload brake 28 will slip under a predetermined torque load and thus prevent any damage to the various components of this apparatus. On the other hand, when the arm 10 is stationary, and the vehicle or manipulator to which the clevis 14 is mounted is moving and the arm 10 engages some object which tends to turn the arm 10 the brake mechanism 28 will likewise slip and permit the arm 10 to swing out of the way.

Any tendency of the arm 10 to wobble back and forth about its pivot axis (i.e. the axis of the pivot shaft 12) is resisted by the braking clutch 28 acting through the bevel gears 100–94 to the output shaft 84 of the reverse locking clutch 82. Since the function of this reverse locking clutch is to prevent any rotation of the output shaft 84 caused by feedback from the load it drives, any such feed back load (i.e. whatever gravitational or inertial forces which would tend to cause the arm 10 to wobble) is isolated by the reverse locking clutch 82 from the speed reducer 72, which reducer 72 is thus eliminated as a source of backlash.

Now therefore, we claim:

1. A power driven swing arm apparatus comprising:
 (a) a first mounting member,
 (b) a second arm member having a lengthwise dimension and pivotally mounted to said first mounting member for swing motion about a pivot axis generally transverse to said lengthwise dimension,
 (c) a drive motor mounted in one of said members,
 (d) a reverse locking clutch operatively engaging said motor and mounted to the same member as said motor,
 (e) a first bevel gear operatively engaged to said reverse locking clutch hand mounted to the same member as said motor,
 (f) a second bevel gear operatively engaging said first bevel gear, and
 (g) an overload brake operatively connected between said second bevel gear and the member other than the one to which said motor is mounted, said overload brake being such that above a predetermined torque load between said first and second members, said second bevel gear will slip with respect to said other member.

2. The apparatus as recited in claim 1, wherein said second bevel gear has its center axis coincident with said pivot axis.

3. The apparatus as recited in claim 1 wherein said second member is mounted to said first member in a manner that there is bearing therebetween at at least two locations along said pivot axis, and said overload brake is mounted at a position outside of said two locations so as to be accessible from outside the apparatus.

4. The apparatus as recited in claim 1, wherein there is a speed reducer between said motor and said reverse locking clutch, with the reverse locking clutch isolating any backlash in said speed reducer from any feedback load transmitted to said members.

5. The apparatus as recited in claim 1, wherein said motor, reverse locking clutch and first bevel gear are mounted in said second arm member.

6. The apparatus as recited in claim 5, wherein said arm member has a root end by which it is mounted to said first member and an outer end located opposite to said root end along the longitudinal axis of said arm, and said motor, reverse locking clutch and bevel gear are mounted along the longitudinal axis of said arm, with said first bevel gear being nearest said root end, said motor being located further from said root end, and said reverse locking clutch being located between said motor and said first bevel gear.

7. A power driven swing arm apparatus comprising:
(a) a mounting member,
(b) an arm member pivotally mounted by its root end to said mounting member for swing motion about a pivot axis, said arm member obtaining bearing from said mounting member at at least two locations spaced along the length of said pivot axis,
(c) a drive motor mounted in said arm,
(d) a reverse locking clutch operatively engaging said motor and mounted in said arm between said root end of said arm and said motor,
(e) a first bevel gear operatively engaged to said reverse locking clutch and mounted in said arm between said reverse locking clutch and the root end of said arm,
(f) a second bevel gear operatively engaging said first bevel gear and having a center axis concident with said pivot axis,
(g) an overload brake operatively connected between said second bevel gear and said mounting member and being located outside of said two bearing locations, said overload brake being such that above a predetermined torque load between said arm and said mounting member, said bevel gear will slip with respect to said mounting member.

8. The apparatus as recited in claim 7, wherein said arm is mounted to said mounting member by means of a pivot shaft extending through said two bearing locations to said overload brake and secured to one side of said overload brake, with the other side of said overload brake being secured to said mounting member, said second bevel gear being secured to said pivot shaft.

References Cited by the Examiner
UNITED STATES PATENTS

| 2,017,083 | 10/1935 | Willink. | |
|---|---|---|---|
| 2,597,140 | 5/1952 | Versnel | 192—150 |
| 2,623,618 | 12/1952 | Howard | 192—48 |
| 3,091,316 | 5/1963 | Huffman | 192—150 |

DON A. WAITE, *Primary Examiner.*